(12) United States Patent
Shindo et al.

(10) Patent No.: US 6,478,365 B1
(45) Date of Patent: Nov. 12, 2002

(54) CRASH SAFETY DEVICE OF VEHICLE

(75) Inventors: Takeshi Shindo, Kanagawa (JP); Makoto Inoue, Kanagawa (JP); Kenji Nakanose, Kanagawa (JP)

(73) Assignees: Isuzu Motors Limited (JP); Shonan Unitec Co., Ltd. (JP)

( * ) Notice: Subject to any disclaimer, the term of this patent is extended or adjusted under 35 U.S.C. 154(b) by 0 days.

(21) Appl. No.: 09/744,861

(22) PCT Filed: May 25, 2000

(86) PCT No.: PCT/JP00/03349

§ 371 (c)(1),
(2), (4) Date: Jan. 26, 2001

(87) PCT Pub. No.: WO00/73124

PCT Pub. Date: Dec. 7, 2000

(30) Foreign Application Priority Data

May 28, 1999 (JP) ............................................ 11-149098

(51) Int. Cl.[7] .............................................. B60R 21/05
(52) U.S. Cl. ........................ 296/189; 296/70; 280/752; 74/512
(58) Field of Search ................... 296/189, 70; 180/271, 180/274; 280/752, 748; 74/512

(56) References Cited

U.S. PATENT DOCUMENTS 6,041,674 A * 3/2000 Kato ............................ 74/512

FOREIGN PATENT DOCUMENTS

| JP | A-62-56378 | | 4/1987 |
| JP | A-62-59580 | | 4/1987 |
| JP | A-07-31516 | | 6/1995 |
| JP | 10016686 | * | 1/1998 |
| JP | 10016687 | * | 1/1998 |
| JP | 10029483 | * | 3/1998 |
| JP | 100071903 | * | 3/1998 |
| JP | 23-236252 | * | 9/1998 |

* cited by examiner

*Primary Examiner*—Joseph D. Pape
(74) *Attorney, Agent, or Firm*—Morrison & Foerster LLP

(57) ABSTRACT

A master vac (6) is connected and fixed to a dash panel (20) side via a bendable pedal bracket (1), and a striker (4) extends forward toward a longitudinal direction of a vehicle and is arranged in such a manner as to protrude a front end (4a) thereof from the dash panel (20) at a normal time when an external force is not applied. When the external force is applied, the striker (4) is pressed, the pedal bracket (1) is deformed on the basis of a weakened portion (16) together therewith, and a master cylinder (7) moves to a position apart from a knee (31), whereby an interference between both elements can be avoided. As a result, in the case that the external force is applied to a front surface of the cab, it is possible to prevent the knee (31) of a driver from interfering with a clutch master vac mounting portion (24) and a brake master vac mounting portion (25) and it is possible to improve a safety of the driver.

2 Claims, 9 Drawing Sheets

(a)  (b)  (c)

CRASH SAFETY DEVICE OF VEHICLE

TECHNICAL FIELD

The present invention relates to a crash safety device of a vehicle for preventing a knee of a driver from interfering with a brake master vac mounting portion, a clutch master vac mounting portion or the like at a time when a great force is applied at a time of collision of the vehicle or the like so as to keep safety of the driver.

BACKGROUND ART

FIGS. 9 and 10 show a summary of a steering master vac mounting portion 26, a brake master vac mounting portion 25a and a clutch master vac mounting portion 24a within a cab in a forward control vehicle, and a mounting structure therefor.

As shown in FIG. 10, a leg portion 30 of a driver brought into contact with a floor panel 23 on the sole of a foot and being in a normal drive attitude holds the steering column portion 26 between the leg portions 30 and 30 as shown in FIG. 9, and a knee 31 thereof is arranged at a position substantially opposing to the brake master vac mounting portion 25a and the clutch master vac mounting portion 24a so as to be comparatively close thereto.

The brake master vac mounting portion 25a and the clutch master vac mounting portion 24a are arranged along a longitudinal direction of the vehicle, and are respectively constituted by a brake pedal bracket 37, a brake master vac 27 and a brake master cylinder 28, and a clutch pedal bracket 1a, a clutch master vac 6, a clutch master cylinder 7 and the like. The brake master vac 27 and the clutch master vac 6 are arranged so that front surfaces thereof are respectively fixed to the brake pedal bracket 37 and the clutch pedal bracket 1a, and the brake master cylinder 28 and the clutch master cylinder 7 are respectively arranged so that rear surfaces thereof are directed to the knee 31 side. The brake pedal bracket 37 and the clutch pedal bracket 1a are respectively connected and supported to a front frame 21 and a front mount rail 22 which are connected to upper and lower portions of the front panel 19, as shown in FIG. 10. In this case, a brake pedal 29 and a clutch pedal 5 (FIG. 1) are respectively connected to the brake pedal bracket 37 and the clutch pedal bracket 1a.

On the contrary, the steering column portion 26 is constituted by a steering boot 32 connected to the floor panel 23, a steering cowl 33 arranged thereabove, a steering shaft 35 supported to a steering support bracket 34, a steering handle 36 or the like. These elements are arranged at the position held between the leg portions 30 and 30 of the driver as mentioned above, and the steering handle 36 is arranged close to the driver's side.

When a great force is applied to the vehicle having the structure mentioned above at a time of collision or the like, as shown in FIG. 11, the front panel 19 moves rearward, the brake pedal bracket 37 and the clutch pedal bracket 1a are pressed, and the brake master vac mounting portion 25a and the clutch master vac mounting portion 24a largely moves rearward. On the contrary, the driver is pressed forward due to an inertia force, and the leg 31 moves to a position shown by a solid line from a position shown by a dot line in the drawing. Accordingly, there is a possibility that the knee 31 is brought into contact with the brake master cylinder 28 and a rear end 7a of the clutch master cylinder 7.

In order to solve the problem mentioned above, various kinds of devices have been conventionally proposed, for example, Japanese Unexamined Utility Model Publication Nos. 62-56378, 62-59580 and 7-31516 can be listed up.

"Instrument Panel Frame of Automobile" described in Japanese Unexamined Utility Model Publication No. 62-56378 corresponds to a structure in which a flange and an inclined surface are formed in the instrument panel frame provided in a lower portion of the instrument panel in a vehicle having equipment such as a master vac of a brake, a heater unit and the like within a vehicle body in front of the instrument panel so as to change directions of the master vac of the brake and the heater unit by the flange and the inclined surface when an external force is applied at a time of collision or the like, thereby preventing the elements from entering to the driver's side, and as the result, a safety is kept. Accordingly, the structure itself is effective, however, is largely different from the present invention mentioned below in view of the structure.

Further, "Vehicle Panel" described in Japanese Unexamined Utility Model Publication No. 62-59580 corresponds to a structure in which a slit is provided in a panel arranged in such a manner as to oppose to a front end of a brake device, and the front end of the brake device expands the slit and enters to the panel side at a time when an external force is applied, so as to reduce an impact force applied to the brake device, thereby preventing the brake device from moving rearward to the steering side. The slit portion may be compared with a weakened portion in accordance with the present invention mentioned below, however, the known art is as a whole largely different from the present invention in view of the structure.

Further, "Knee Protector of Automobile" described in Japanese Unexamined Utility Model Publication No. 7-31516 corresponds to a structure in which a knee protector for covering a rear end side of a member such as a master cylinder is provided therein so as to prevent the master cylinder from being directly brought into contact with a leg portion of a driver and the knee protector is deformed so as to shift the leg portion brought into contact with the knee protector in an oblique direction, thereby reducing an impact force applied to the leg portion. That is, an object of the prior art is to reduce an application of the impact force due to the collision, and is not to prevent a rigid member such as a master cylinder from being brought into contact with the leg portion in accordance with the present invention. Accordingly, this prior art is different from the present invention in view of a structure, an object and an effect.

The present invention is made by taking the matters mentioned above into consideration, and an object of the present invention is to provide a crash safety device of a vehicle which securely prevents a brake master vac mounting portion and a clutch master vac mounting portion from being brought into contact with a leg portion of a driver by comparatively simple means for changing support positions of the brake master vac mounting portion and the clutch master vac mounting portion at a time when a great force is applied such as at a vehicle collision time or the like, thereby keeping a safety of the driver.

DISCLOSURE OF THE INVENTION

In order to achieve the object mentioned above, in accordance with the present invention, there is provided a collision safety device for preventing a knee of a driver from interfering with a brake master vac mounting portion and a clutch master vac mounting portion in a vehicle at a time when an external force is applied at a time of collision of a vehicle or the like, the brake master vac mounting portion being supported to a pedal bracket arranged at a position substantially opposing to the knee of the driver and fixed to a rigid member such as a dash panel or the like in a front surface side of a cab, wherein the pedal bracket of the master vac mounting portion arranged along a longitudinal direction of the vehicle is provided with a first bracket having a bent portion for fixing a master vac to a rear surface side and fixing a front surface side to the rigid member and a second bracket supported to the first bracket in a cantilever manner and having a striker extending forward along a longitudinal direction of the vehicle and including a front end side arranged in a free end side thereof so as to pass through the rigid member, and a weakened portion is formed in the bent portion of the first bracket and a base end portion of the striker in the second bracket.

In more particular, the structure is characterized in that a guide hole for holding the striker is provided in the rigid member through which the striker passes.

At a time when an external force is applied, the front panel or the like moves rearward so as to intend to press the brake master vac mounting portion and the clutch master vac mounting portion fixed to the rigid member such as the dash panel or the like to the driver side. However, in the case of the present invention, the front panel or the like is brought into contact with the striker of the pedal bracket so as to press the striker. The striker is structured such as to be supported in a cantilever manner to the first bracket side of the pedal bracket so as to apply a moment to the first bracket side. Further, since a weakened portion is formed in the base end portion of the striker and the first bracket, the pedal bracket is deformed due to an application of the moment generated by a pressing force applied to the striker and moves in a direction of moving apart from the knee of the driver, thereby preventing the knee from interfering with the master vac mounting portions mentioned above.

Further, when arranging the brake master vac, the brake master cylinder and the like in the brake master vac mounting portion in a direction perpendicular to the longitudinal direction of the vehicle, it is possible to prevent the knee from interfering with the elements at a time when the external force is applied. In accordance with the structure mentioned above, it is possible to secure a safety of the driver.

BEST MODE FOR CARRYING OUT THE INVENTION

A description will be in detail given below of an embodiment of a crash safety device of a vehicle in accordance with the present invention with reference to the accompanying drawings.

Figure 1:
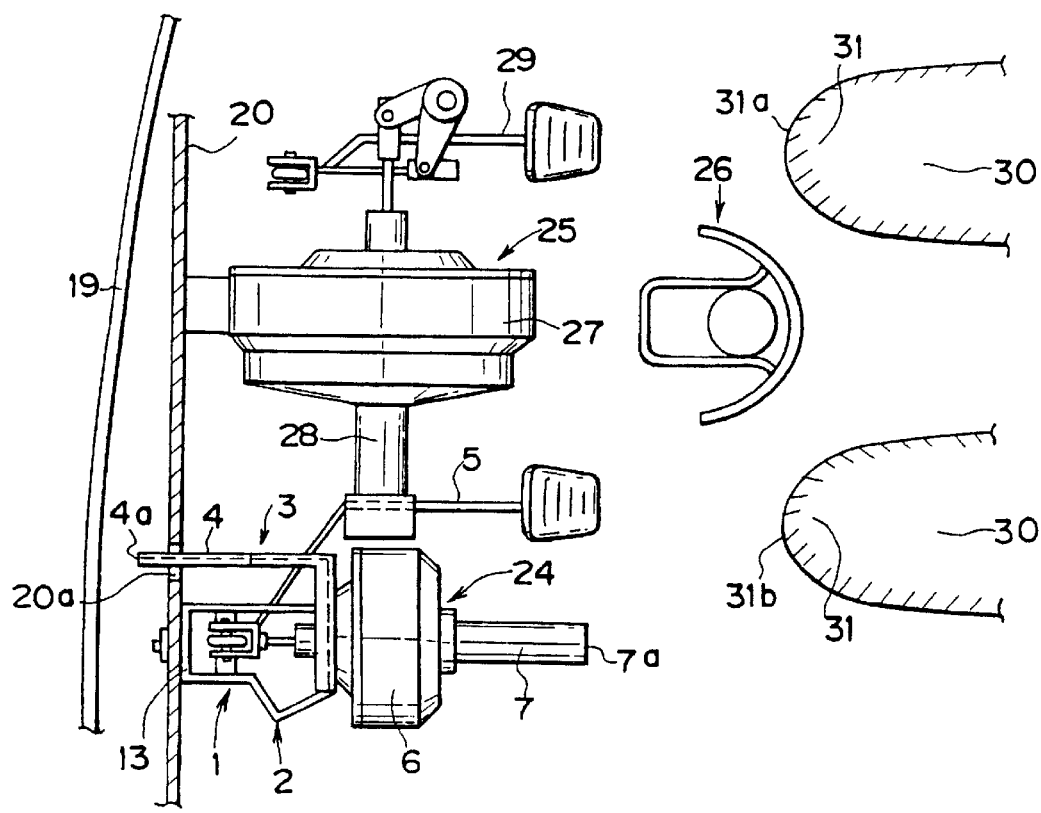
FIG. 1 is a top view showing a clutch master vac mounting portion supported by a pedal bracket in accordance with the present invention, a horizontally-placed brake master vac mounting portion and a steering column portion, and a relation between these elements and knees of a driver.

As shown in FIG. 1, a front panel 19 is provided on a front surface of a cab of a vehicle, and a dash panel 20 is provided in a rear portion thereof.

A clutch master vac mounting portion 24 is arranged along a longitudinal direction of the vehicle as illustrated, and is constituted by a pedal bracket 1 corresponding to a main constituting element of the present invention, a clutch master vac 6, a clutch master cylinder 7 and the like.

On the contrary, a brake master vac mounting portion 25 is arranged in a direction perpendicular to the longitudinal direction of the vehicle, that is, in a horizontal direction in the present embodiment, and is constituted by a brake pedal bracket (not shown), a brake master vac 27, a brake master cylinder 28 and the like.

Figure 10:
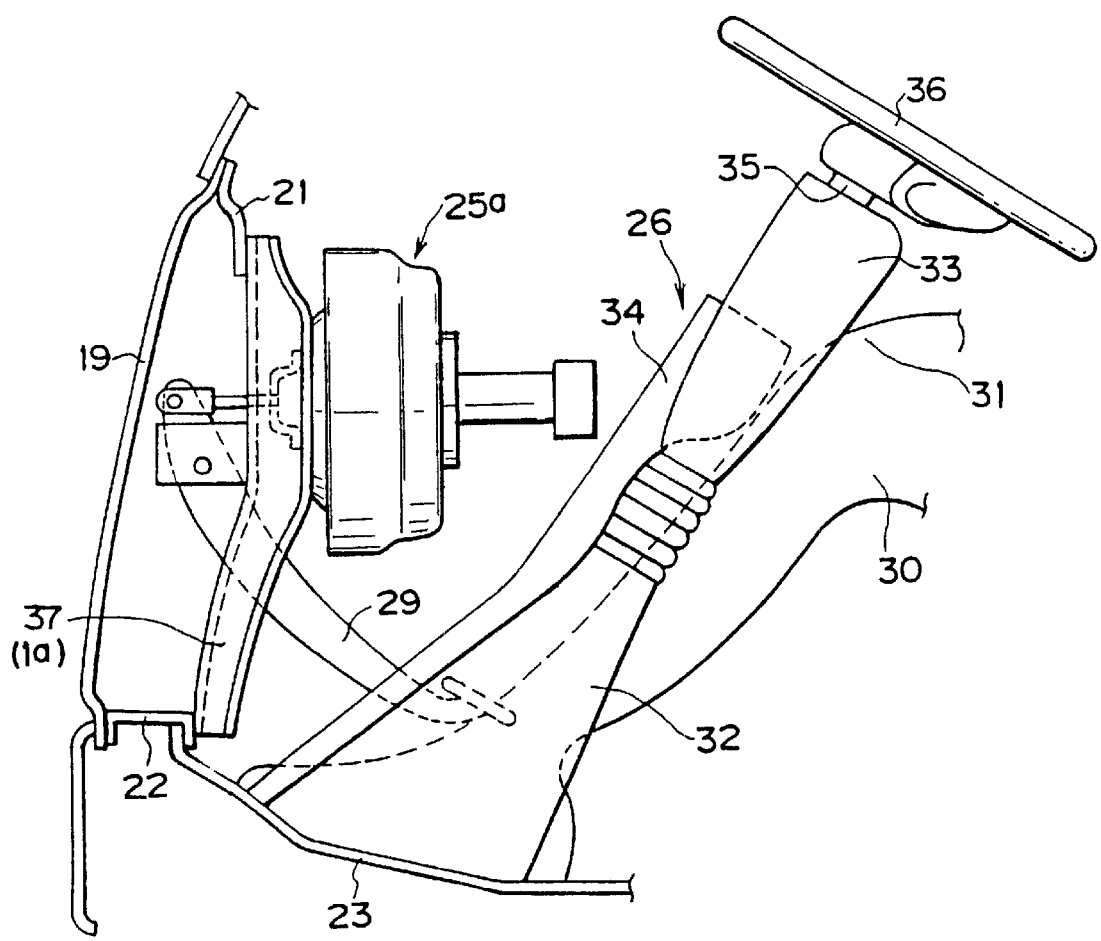
FIG. 10 is a side view of FIG. 9.
Figure 11:
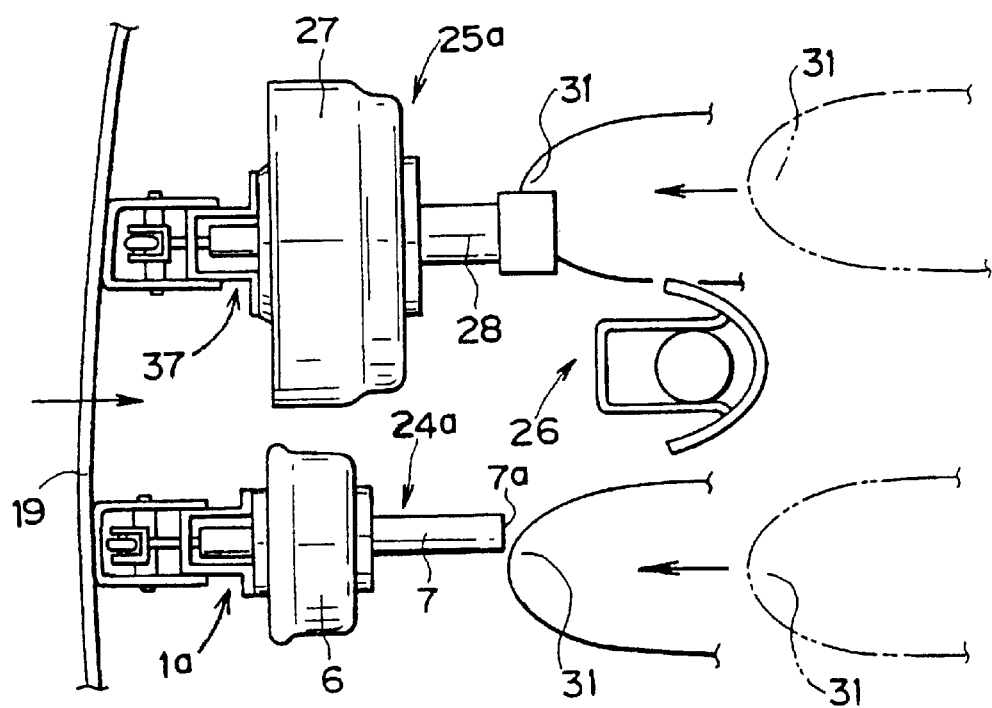
FIG. 11 is a top view showing a relation between the respective master vac mounting portions in accordance with the conventional art and the knees of the driver at a time when the external force is applied.

Further, a steering column portion 26 is arranged between right and left knees 31 of a leg portion 30 of a driver. The steering column portion 26 is constituted by a steering boot 32 connected to a floor panel 23, a steering cowl 33 arranged thereabove, a steering shaft 35 supported to a steering support bracket 34, a steering handle 36 and the like, as shown in FIG. 10.

In this case, in the present embodiment, since the brake master vac mounting portion 25 is laterally directed as illustrated, the brake master vac mounting portion 25 is arranged at a position apart from a right knee 31a of the driver and does not have a particular problem at a time when an external force is applied, so that a detailed description thereof will be omitted in the following description.

Further, since the steering column portion 26 is inherently held between the right knee 31a and a left knee 31b and does not coincide with the object of the present invention, a description concerning a relation with respect to the driver when the external force is applied will be omitted.

Accordingly, the following description will be given in detail of interference prevention between the clutch master vac mounting portion 24 and the knee 31 (the left knee 31b) of the leg portion 30 of the driver.

The clutch master vac mounting portion 24 is constituted by the pedal bracket 1, the clutch master vac 6, the clutch master cylinder 7 and the like, as mentioned above, and the front surface side of the pedal bracket 1 is fixed and supported to the dash panel 20 or the like corresponding to a rigid member. Further, the clutch master vac 6 or the like is connected to a rear surface of the pedal bracket 1, the clutch master cylinder 7 is arranged in such a manner as to extend toward the left knee 31b side, and a rear end 7a thereof is arranged at a position capable of interfering with the left knee 31b if the position of the clutch master cylinder relative to the left knee 31b is maintained when the external force is applied. In particular, if the driver should move his or her leg portion 30 away from the steering column portion 26, the rear end 7a of the clutch master cylinder 7 may be arranged at a position opposing the left knee 31b.

Figure 2:
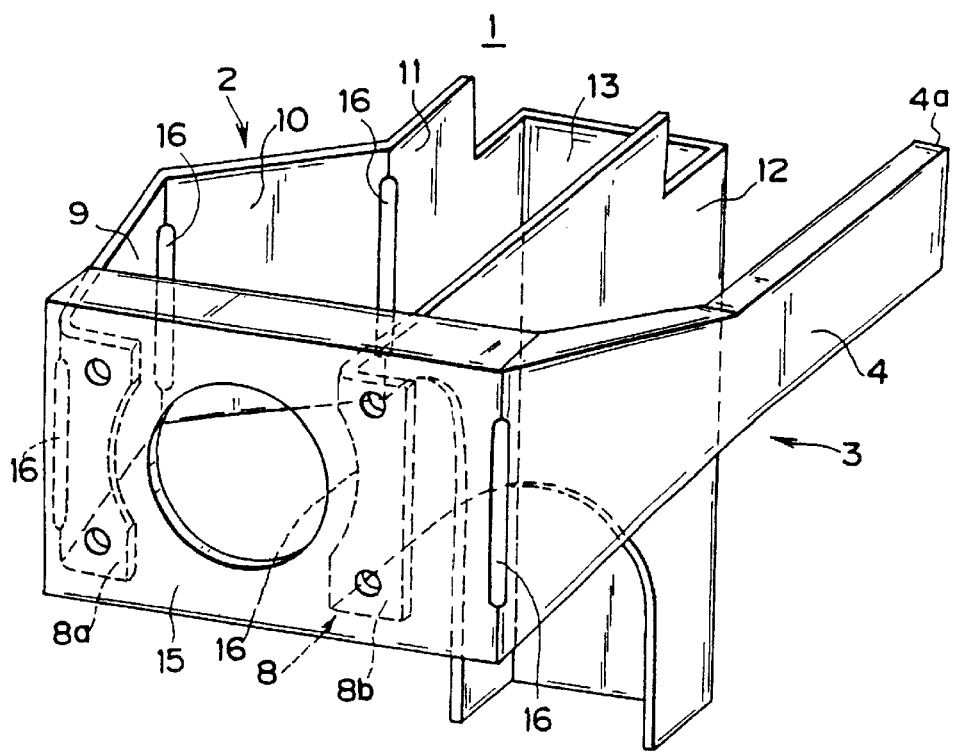
FIG. 2 is a perspective view showing a whole structure of the pedal bracket in accordance with the present invention.

Next, a description will be given of a structure of the pedal bracket 1 corresponding to a main constituting element of the present invention with reference to FIG. 2. The pedal bracket 1 is mainly constituted by a first bracket 2 and a second bracket 3 having a striker 4. FIG. 2 shows a state in which the first bracket 2 and the second bracket 3 are combined. In this case, as shown in FIG. 1, the clutch pedal 5 is held to the first bracket 2, and the clutch master vac 6 connecting the clutch master cylinder 7 thereto is fixed to the second bracket 3.

Figure 3:
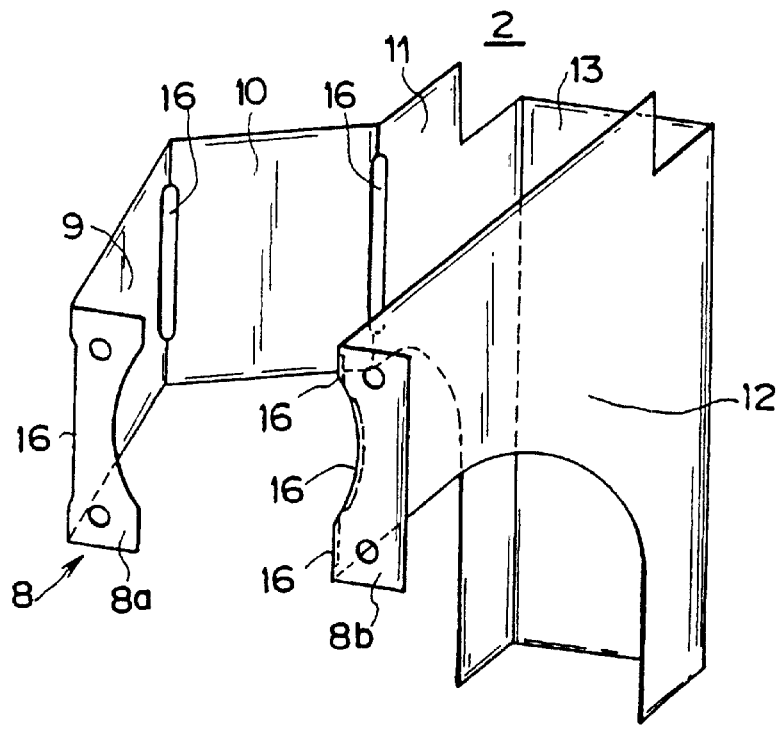
FIG. 3 is a schematic view showing a first bracket of the pedal bracket in accordance with the present invention.

The first bracket 2 is, as shown in FIG. 3, constituted by a flange portion 8 comprising a left flange portion 8a and a right flange portion 8b, a first inclined plate portion 9 obliquely bent from the left flange portion 8a, a second inclined plate portion 10 further obliquely bent from the first inclined plate portion 9, a first side plate portion 11 formed along a longitudinal direction of the vehicle from an end portion thereof, a second side plate portion 12 vertically bent from the right flange portion 8b so as to be formed along a longitudinal direction of the vehicle, and a front end plate portion 13 connecting the first side plate portion 11 and a front end of the second side plate portion 12.

Figure 4:
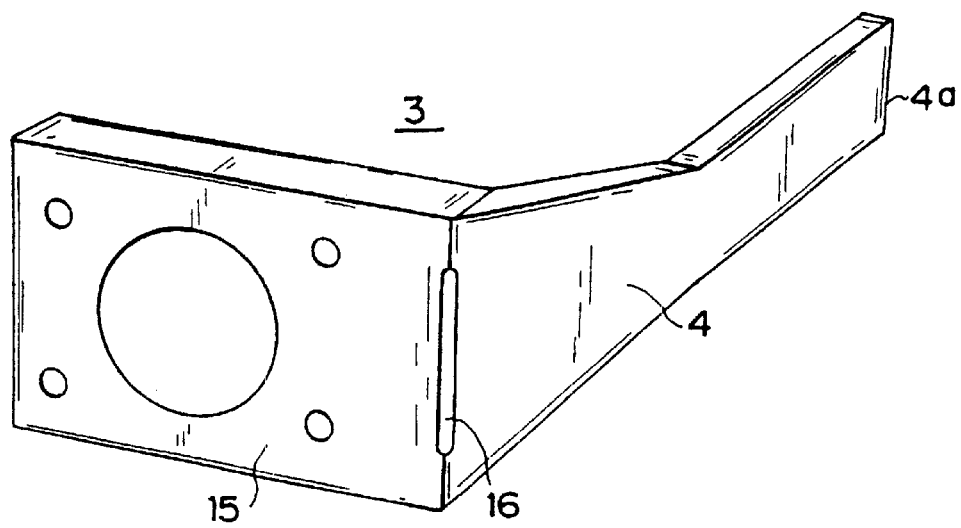
FIG. 4 is a schematic view showing a second bracket of the pedal bracket in accordance with the present invention.

The second bracket 3 is, as shown in FIG. 4, constituted by a flat plate portion 15 to which the clutch master vac 6 (FIG. 1) is mounted and the striker 4 vertically bent from one end portion (a right end portion in the drawing) of the flat plate portion 15 so as to extend forward along the longitudinal direction of the vehicle. The second bracket 3 is fixed to the flange portions 8a and 8b of the first bracket 2 so as to form a suitable interval between the second side plate portion 12 of the first bracket 2 and the striker 4 of the second bracket 3, thereby constituting the pedal bracket 1. Further, a front end 4a of the striker 4 protrudes forward from the front end plate portion 13 of the first bracket 2 and is arranged so as to extend through the dash panel 20. That is, as shown in FIG. 1, a through hole through which the striker 4 passes is provided in the dash panel 20, however, the through hole corresponds to a guide hole 20a (FIG. 1) for guiding the striker 4, and the guide hole 20a is actually formed in a slot hole shape to which the striker 4 can be inserted.

As shown in FIG. 1, the pedal bracket 1 having the structure mentioned above is structured such that the front end plate portion 13 of the first bracket 2 is fixed to the dash panel 20. In this state, the rear end 7a of the clutch master cylinder 7 is arranged toward the left knee 31b side.

Figure 5:
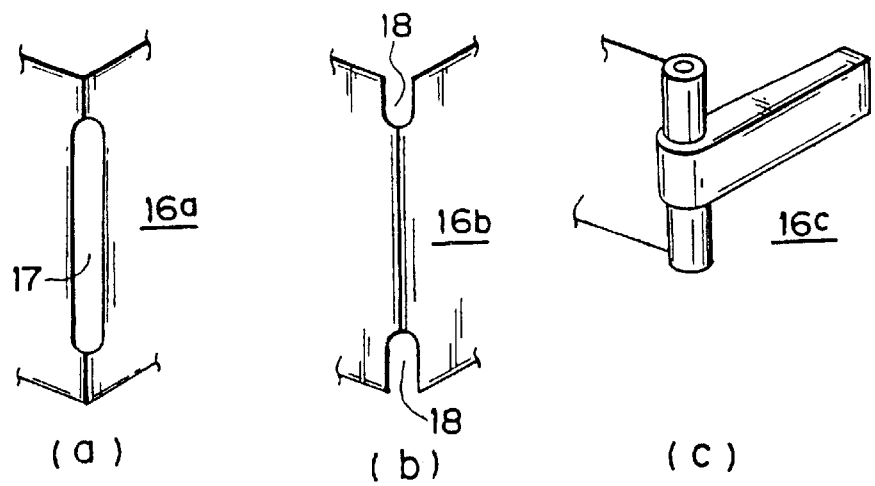
FIG. 5 is a schematic view showing some examples (a), (b) and (c) of a weakened portion formed in the first bracket and the second bracket.

As shown in FIGS. 2 to 4, weakened portions 16 for reducing a strength of bent corner portions in the first bracket 2 and the second bracket 3 are formed in the bent corner portions of the first bracket 2 and the second bracket portion 3. The weakened portion 16 is exemplified by a structure shown in FIG. 5, however, the structure is of course not limited to this. A weakened portion 16a shown in FIG. 5(a) is constituted by a slot hole 17 provided in a middle portion of the bent corner portion, a weakened portion 16b shown in FIG. 5(b) is constituted by a notch 18 formed in upper and lower end edges of the bent corner portion, and a weakened portion 16c shown in FIG. 5(c) is constituted by a hinge formed in the bent corner portion. In any cases, the bent corner portion can be easily bent and deformed due to a small external force by forming the weakened portion 16 mentioned above.

Figure 6:
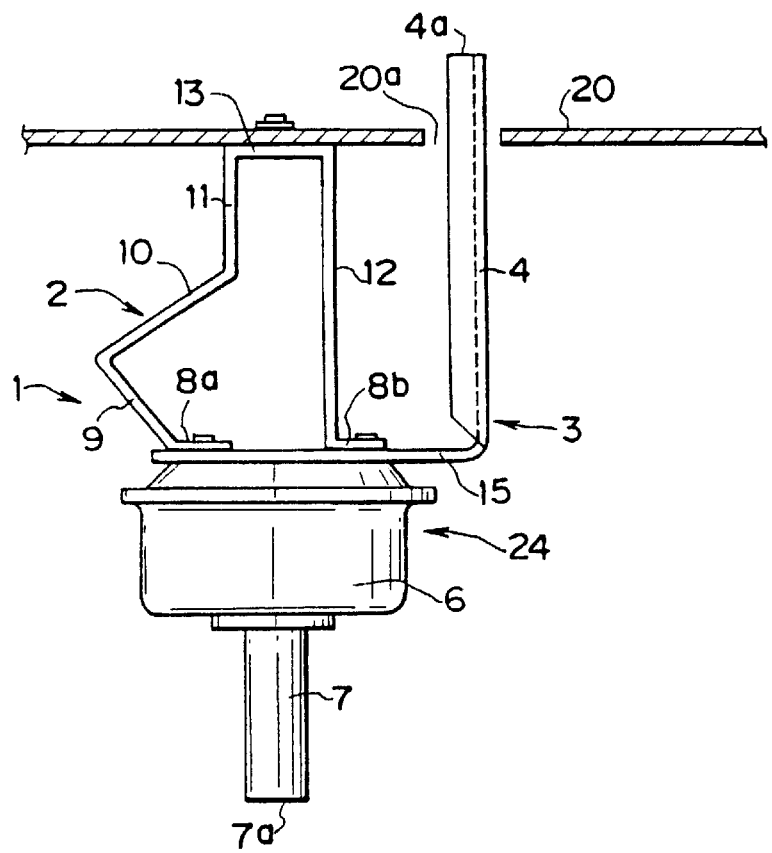
FIG. 6 is a schematic view showing an aspect of arranging the clutch master vac mounting portion in accordance with the present invention at a normal time.

Next, a description will be given of a relation between the clutch master vac mounting portion 24 or the like and the knee 31 of the driver or the like when the external force is applied. FIG. 6 shows an arrangement state of the clutch master vac mounting portion 24 in a normal time when no external force is applied. That is, the second bracket 3 of the pedal bracket 1 arranges the striker 4 along the longitudinal direction of the vehicle, and is arranged so as to protrude the front end 4a thereof from the guide hole 20a of the dash panel 20, and the clutch master vac 6 and the clutch master cylinder 7 fixed to the flat plate portion 15 are arranged along the longitudinal direction of the vehicle.

Figure 7:
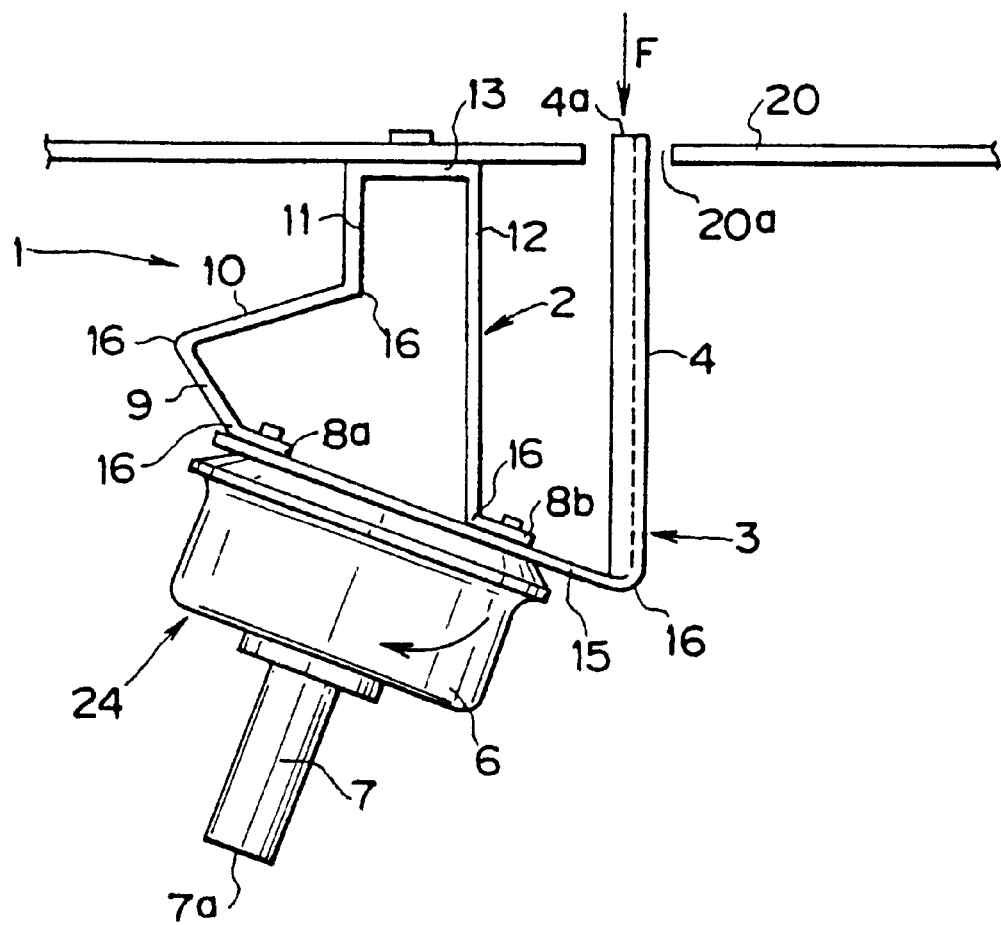
FIG. 7 is a schematic view showing a deformed state in the case that an external force F is applied to the clutch master vac mounting portion in FIG. 6.
Figure 8:
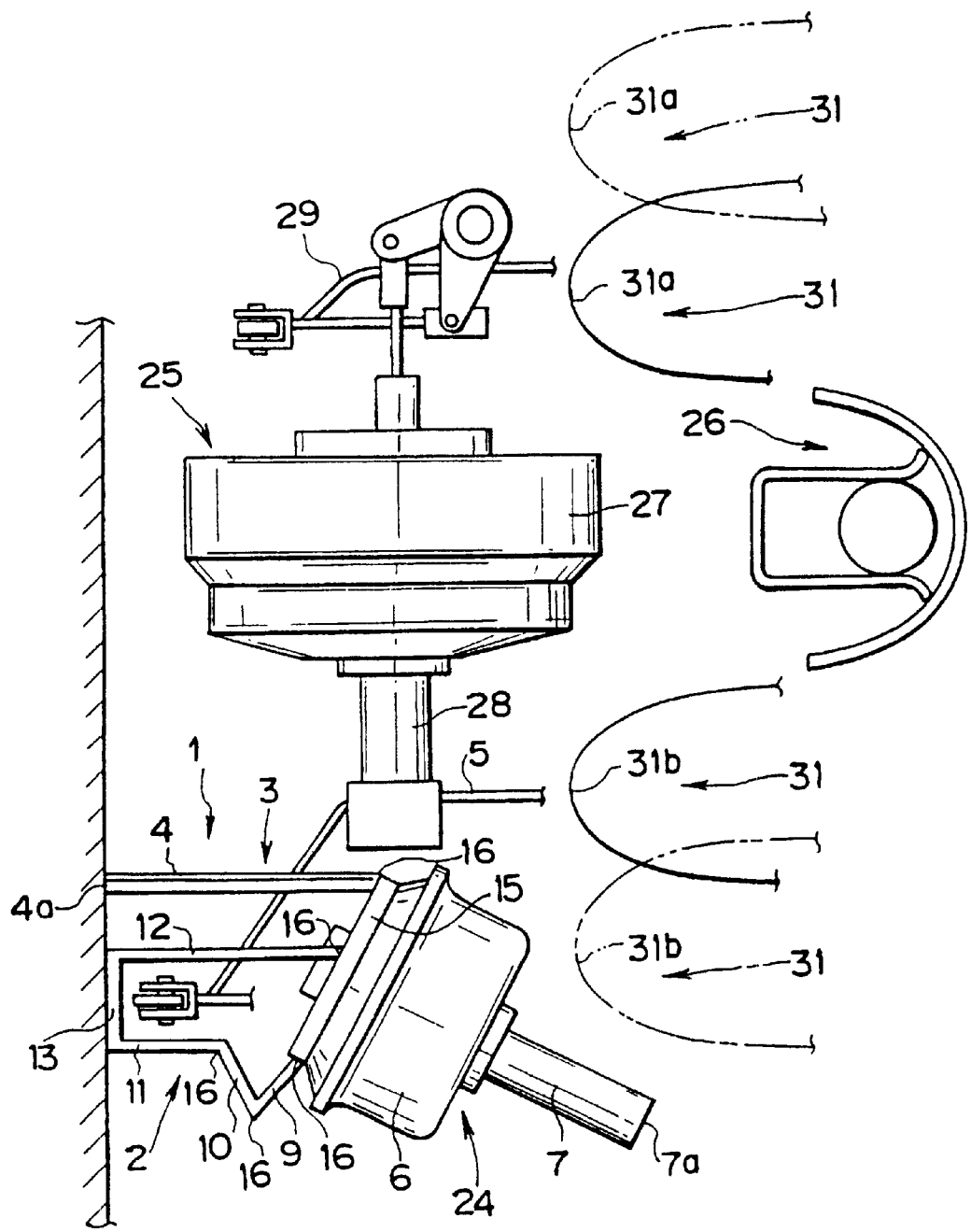
FIG. 8 is a top view showing a relational position among the clutch master vac mounting portion, the brake master vac mounting portion, the steering column portion and the knees of the driver at a time when the external force is applied as shown in FIG. 7.
Figure 9:
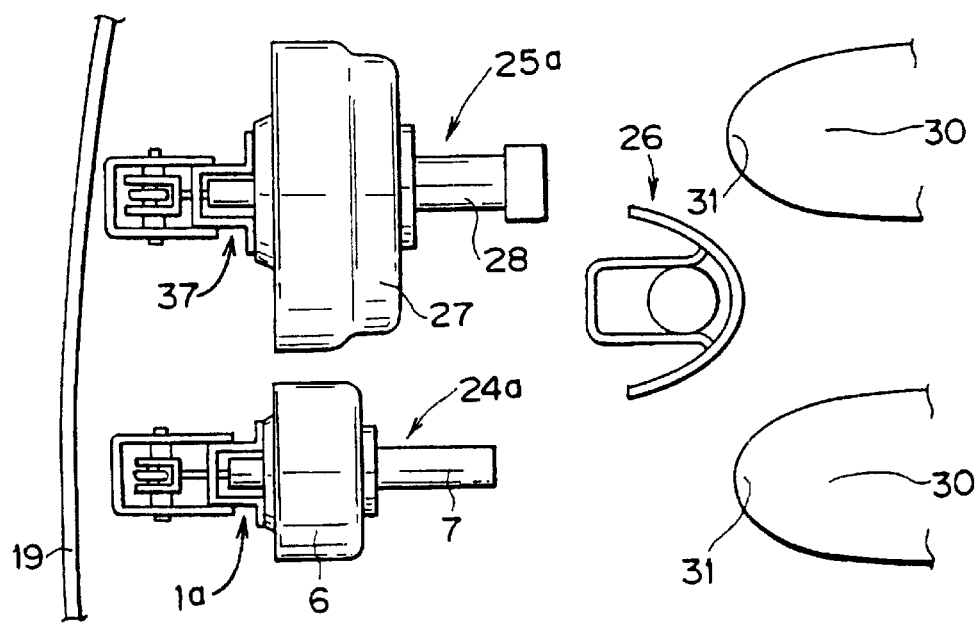
FIG. 9 is a top view showing a relation among a brake master vac mounting portion, a clutch master vac mounting portion, a steering column portion and the like in accordance with a conventional art and the knees of the driver.

FIGS. 7 and 8 show a state in which the external force is applied to the clutch master vac mounting portion 24 in the state shown in FIG. 6. When the external force is applied, a great force F is applied to the front end 4a of the striker 4 protruding forward from the dash panel 20. Accordingly, the striker 4 moves rearward, however, since the striker 4 is guided by the guide hole 20a of the dash panel 20, the striker moves rearward in a substantially straight manner along the longitudinal direction of the vehicle. Since the striker 4 is arranged at a position apart from the first bracket 2 as mentioned above, a moment is applied to the first bracket 2 side due to the force F applied to the striker 4. Further, the force F is applied to a connecting portion between the striker 4 and the flat plate portion 15. As mentioned above, the first bracket 2 itself is constituted by the comparatively rigid member, however, since the weakened portion 16 is formed in the bent corner portion thereof and the weakened portion 16 is also formed in the connecting portion (the base end portion) between the striker 4 of the second bracket and the flat plate portion 15, the pedal bracket 1 is deformed due to the moment generated by the force F as shown in FIGS. 7 and 8 so as to largely rotate the clutch master vac 6 and the clutch master cylinder 7 toward the outer side.

In the manner mentioned above, as shown in FIG. 8, the rear end 7a of the clutch master cylinder 7 is rotated to the position largely apart from the left knee 31b. Accordingly, it is possible to securely avoid an interference between the left knee 31b and the rear end 7a. Even when moving the left knee 31b to an outward opened position as shown by a two-dot chain line in FIG. 8, it is possible to prevent the left knee 31b, the clutch master cylinder 7 and the rear end 7a thereof from being interfered with each other.

On the contrary, since the brake master vac mounting portion 25 is laterally arranged as mentioned above, the brake master vac mounting portion 25 should not interfere with the right knee 31a, whether or not the right knee 31a moves to an outward opened position away from the steering column portion 26. Further, since the steering column portion 26 is held between the right knee 31a and the left knee 31b, there is no particular problem.

In the description mentioned above, the pedal bracket 1 is structured in the manner mentioned above, however, the structure is not limited to this structure, the structure may be employed as far as deforming so that the clutch master cylinder 7 side rotates in a direction of moving apart from the left knee 31b side when the external force is applied.

The advantages in accordance with the present invention mentioned above are as follows in summary.

In accordance with the crash safety device of the vehicle of the present invention, since the pedal bracket is deformed in the direction of moving the master cylinder apart from the knee side when the external force is applied, it is possible to securely prevent the knee from interfering with the clutch master vac mounting portion and the brake master vac mounting portion. Further, the present invention can be comparatively easily realized by the simple structure obtained by only modifying the shape of the pedal bracket for supporting the master vac or the like. On the contrary, the interference with respect to the knee can be avoided by laterally placing the brake master vac mounting portion, and the steering column portion is held between the knees, so that there is no risk.

What is claimed is:

1. A collision safety device for preventing injury to a driver in a vehicle at a time when an external force is applied during a collision, comprising:

a pedal bracket arranged at a position substantially opposing a knee of the driver ands fixed to a dash panel of the vehicle in a front surface side of a cab of the vehicle for supporting a master vac, wherein said pedal bracket includes a first bracket having a bent portion for supporting said master vac and having a front surface side fixed to said dash panel, a second bracket connected to said first bracket in a cantilever manner and having a striker arranged at a free end side of said second bracket, said striker extending forward along a longitudinal direction of the vehicle so as to pass through said dash panel, and a weakened portion formed in the bent portion of said first bracket and a base end portion of said striker in said second bracket.

2. A collision safety device of a vehicle as claimed in claim 1, wherein a guide hole for said striker is provided in said dash panel through which said striker passes.

* * * * *